June 18, 1940.                C. F. O'BRIEN                 2,204,819
                                 CAMERA
                Filed Nov. 9, 1939              2 Sheets-Sheet 1

Inventor
C. F. O'Brien
By Clarence A. O'Brien
and Hyman Berman
Attorneys

June 18, 1940.    C. F. O'BRIEN    2,204,819
CAMERA
Filed Nov. 9, 1939    2 Sheets-Sheet 2
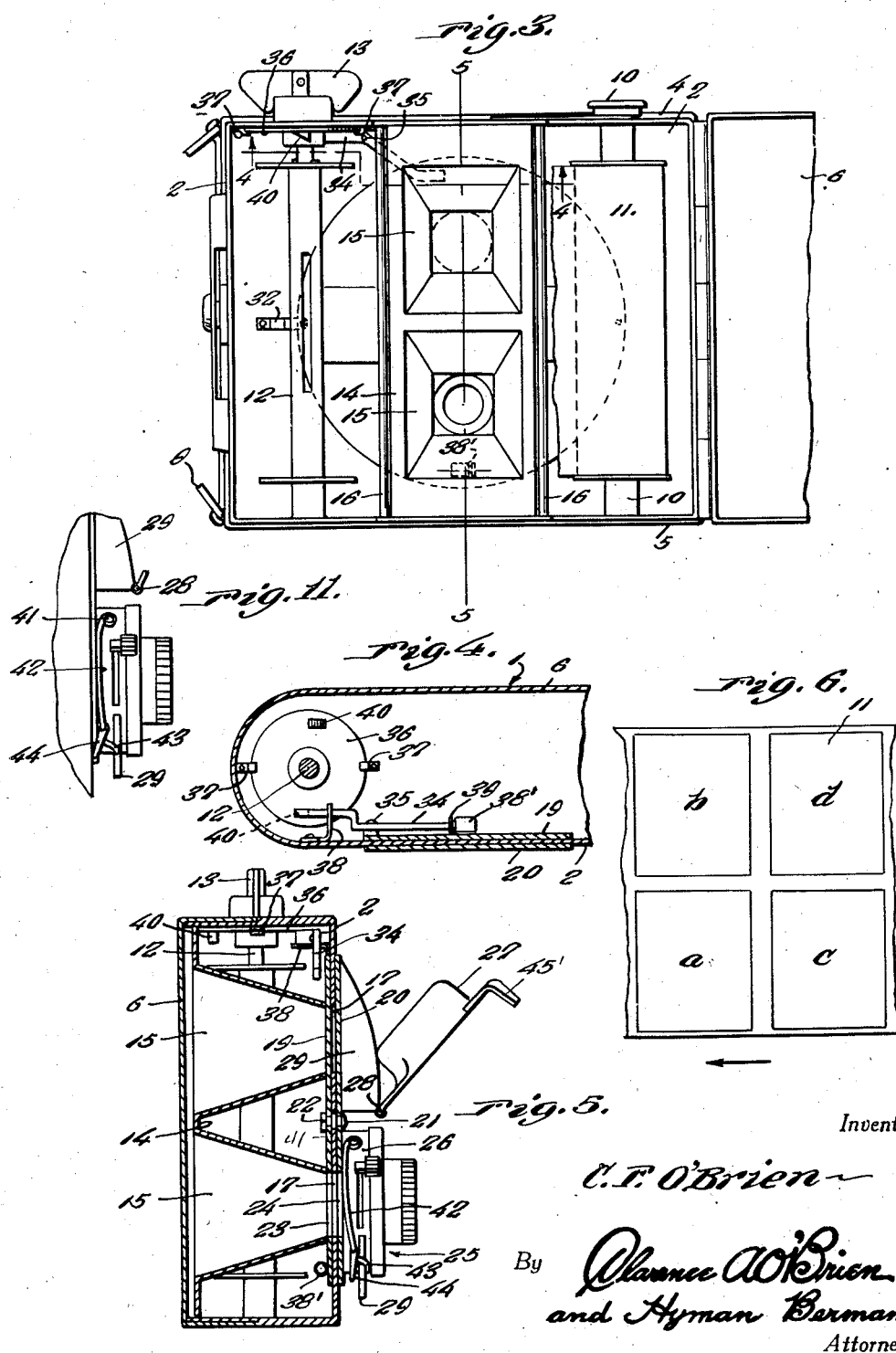

Patented June 18, 1940

2,204,819

UNITED STATES PATENT OFFICE 2,204,819

CAMERA

Charles F. O'Brien, Hollis, N. Y.

Application November 9, 1939, Serial No. 303,664

5 Claims. (Cl. 95—38)

My invention relates to improvements in cameras of the pocket type, and more particularly to locks therefor to prevent misoperation of the camera in the taking of pictures.

By way of explanation the camera with which my invention is particularly concerned is equipped for taking pictures alternately upon opposite sides of the longitudinal center of a roll film and to this end is characterized by a shutter assembly mounted in a turntable embodied in the camera structure and rotatable to adjust the shutter assembly into diametrically opposite positions adjacent the top and bottom of the camera, respectively, for taking of pictures in such positions of the assembly.

My invention is designed with the particular purpose in view of providing efficient locking devices for preventing misoperation of either the turntable or the shutter of such a camera so that pictures may not be taken in either of such positions of the shutter assembly upon previously exposed film.

The invention also comprehends other objects more or less subordinate to the above, all of which, together with the precise nature of my improvements will be readily understood when the succeeding description and claims are read with reference to the drawings accompanying and forming part of this specification.

Figure 1:
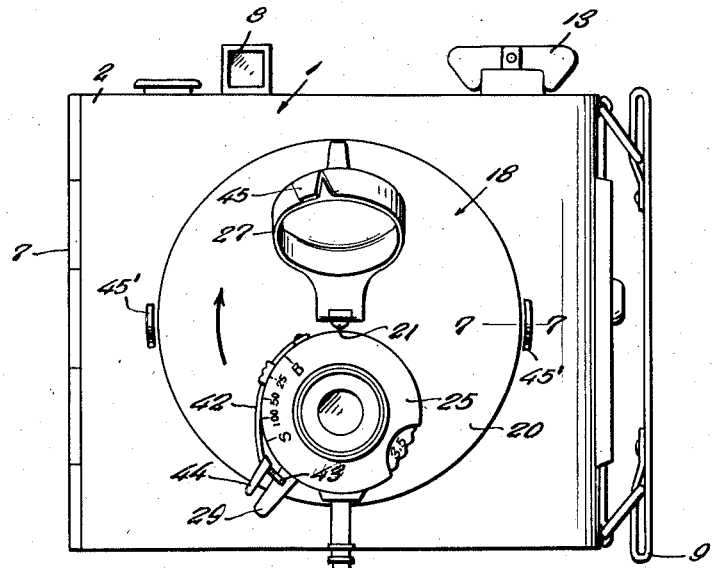
Figure 2:
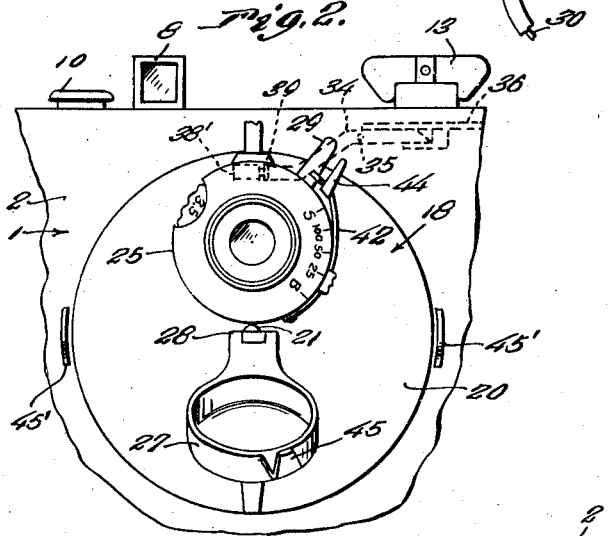

In said drawings:

Figure 1 is a view in front elevation of a camera equipped according to my invention and with the parts in starting position for taking a series of pictures, the shutter assembly being in a normal diametrical starting position for taking the first picture on one side of the longitudinal center of the film, Figure 2 is a similar fragmentary view showing the shutter assembly in its other, diametrically opposite, or secondary, position for taking a picture on the other side of said center of the film, Figure 3 is a view in rear elevation with the cover opened and the parts shown in the Figure 1 position, Figure 4 is a fragmentary view in horizontal section taken on the line 4—4 of Figure 3 looking in the direction indicated by the arrows, Figure 5 is a view in transverse section taken on the line 5—5 of Figure 3 looking in the direction indicated by the arrows, Figure 6 is a fragmentary diagrammatic view of the film and illustrating the orders in which pictures are taken thereon, Figure 7 is a detail view in longitudinal section taken on the line 7—7 of Figure 1 looking in the direction indicated by the arrows, Figure 8 is a fragmentary view in elevation of the table locking lever and lever trip, Figure 9 is a view in longitudinal section of the locking plunger, Figure 10 is a detail view in longitudinal section of the turntable catches, and Figure 11 is a view in side elevation illustrating details of the shutter lock.

Referring now in detail to the drawings, with reference thereto by numerals, the camera, as illustrated, comprises a flat casing 1, substantially rectangular, with the usual rounded ends, front wall 2, a top 4, bottom 5 and a rear side section hinged to one end, as at 7, and forming a cover 6. The sight lens 8 is mounted on the top and the wrist strap 9 on one end as shown in Figure 1. The usual pair of bearing studs 10 are provided in the top 4 and bottom 5, adjacent one end of the casing, for detachably securing a roll of film 11 in the casing, and the usual rewind reel 12 is provided in the casing adjacent the other end thereof for operation by a rewind key 13 adapted in a manner well understood to be pulled outwardly to disengage the same from said reel.

The casing 1 has suitably secured therein, in the transverse center thereof, and extending from top to bottom, a substantially rectangular, partitioning frame 14 forming a pair of upper and lower, small exposure chambers 15 upon opposite sides of the longitudinal center of said casing, said chambers being preferably square transversely and tapering from the front to the rear of the casing, said chambers being open at the front and rear of the casing and the frame 14 having suitably mounted thereon a pair of roller rods 16 extending alongside the rear side edges thereof. As will be understood, the film 11 from the roll is trained over the rear side of the frame 14 and across the rods 16 to the rewind reel 12, the portions of the film upon opposite sides of its longitudinal center being exposed through the chambers 15 respectively. A pair of upper and lower apertures 17 are provided in the front wall 2 of the casing 1, in the transverse center thereof, and upon opposite sides of the longitudinal center for registration with the front ends of said chambers.

The front wall 2 of the casing embodies a circular turntable, designated as a unit by the numeral 18, and which comprises a pair of inner and outer disks 19, 20, secured together concentrically and rotatably mounted on said front wall 2 by a suitably squared bolt 21 rotatably arranged in the center of the wall 2 and having a nut 22 on the inner end thereof, the arrangement being such that said disks are rotatable in unison in sealing engagement with the inner and outer faces of said wall 2. A pair of apertures 23, 24 are provided in the inner and outer disks 19, 20, respectively, in registration with each other and to register with the apertures 17 when the described turntable 18 is rotated.

A shutter unit 25 having a neck part 26 is suitably mounted on the outer disk 20 to register with the apertures 23, 24 so that said unit under rotation of said turntable 18 through 180 degrees may be set into diametrically opposite lower and upper positions to properly register the same with the upper and lower chambers 15. A closure cap 27 is hinged, as at 28, to a radial rib 29 on the outer disk 20 to fit over the lens of the shutter unit 25. The shutter unit 25 is of the type having a shutter operating lever 29 projecting laterally from the neck thereof and also the usual Bowden wire type plunger 30 for operating the shutter by thumb pressure. Since the other details of the shutter unit 25 are immaterial to the present invention, no further description of said unit is thought to be required.

As best shown in Figure 1, in conditioning the camera to take pictures with a new film, before the camera is loaded the turntable 18 is first rotated into a starting position with the shutter assembly 25 registering with the bottom chamber 15. The camera is then loaded, and the first picture taken with the shutter assembly 25 in the described starting position, the first exposure developing on film 11 as shown at a in Figure 6. The turntable 18 is then rotated clockwise, as indicated by the arrow in Figure 1, to set the shutter assembly 25 in the diametrically opposite position, as illustrated in Figure 2, and a second picture taken, the exposure developing on the film as indicated at b in Figure 6. Thus, we now have two pictures taken side by side upon opposite sides of the longitudinal center of the film 11. The film 11 is now fed forward in the usual manner, the turntable 18 rotated to set the shutter assembly 25 in starting position and a picture c taken, the turntable then rotated to set said assembly in diametrically opposite position and another picture d taken. This procedure may be repeated until the film 11 is exhausted.

To prevent misoperation of the turntable 18 and the shutter assembly 25 I provide the following.

In the longitudinal center of the front wall 2 on the under side thereof and riveted thereto as at 31, a pair of resilient leaf spring catches 32 are provided to overlie diametrically opposite sides of the inner disk 19 of the turntable 18, said catches having buttons, as at 33, adapted in the starting, or the diametrically opposite setting of the shutter assembly 25 to snap into depressions, as at 33, in said disk and yieldingly hold said turntable against rotation from either setting of said assembly 25.

To prevent the turntable 18 from being rotated in the diametrically opposite, or secondary, setting of the shutter assembly 25, a turntable lock is provided. The primary element of the turntable lock is a locking lever 34 pivoted, as at 35, intermediate its ends in the casing 1 with a latching end thereof overlying the inner disk 19 and its other end extending alongside a disk-like trip 36 splined on the before mentioned key 13 concentrically thereof and rotatable thereby against the inner face of the top 4. Keeper lugs 37 on said top 4 retain the trip 36 against lateral displacement. A suitably arranged spring 38 yieldingly holds the lever 34 in normal locking position with the other end thereof parallel with said trip 36. A barrel 38' with a spring pressed plunger 39 therein is suitably secured to the inner disk 19 to be rotated in the diametrically opposite setting of the shutter unit 25 into a position opposite the latching end of said lever 34 so that said plunger 39 abuts said end of the lever 34 and thereby prevents further rotation of the turntable 18 in this setting of the shutter assembly 25. A pair of lateral, diametrically opposite, cam lugs, 40, are provided on the trip 36 which, under rotation of the key 13 to feed a new length of film 11 into position, engage the other end of said lever 34 and cam the same out of locking position relative to said plunger 39 so that the turntable 18 may be rotated. In the locking position of the locking lever 34, the plunger 39 is tensioned against the same. When said lever 34 is moved to unlocking position, said plunger 39 swings forwardly under said lever 34 and holds the same out of the way until the plunger 39 and barrel 38' have been moved past the same, after which said lever is returned to locking position by the spring 38.

To prevent the shutter assembly 25 from being misoperated I provide the following devices.

Suitably secured, at one end thereof, as at 41, to the neck 26 of said assembly 25 is a wire-like spring 42 extending along said neck 26 to the operating lever 29 and having an angular end 43 adapted after said lever has been operated, as in taking a picture, to engage one side edge of said lever, as shown in Figure 11, and thereby lock said lever against repeated operation, said end 43 being movable under flexing of the spring into unlocking position in which it disengages the edge of said lever 29.

A finger 44 extends from the free end of the spring 42 over the edge of the outer disk 22 of turntable 18. A pair of cam lugs 45' are provided on the outer face of the front wall 2 of the casing 1 in the longitudinal center of said wall and at diametrically opposite sides of said disk 20 over which the finger 44 wipes under rotation of the turntable 18, the arrangement being such that under such wiping engagement, the spring 42 is flexed to move end 43 thereof to unlocking position when the shutter assembly 25 has been rotated into a position intermediate the starting and diametrically opposite, or secondary position thereof, and also when said assembly has been rotated into a position intermediate the secondary and starting settings thereof. The before-mentioned cap 27 is provided with an edge lug 45' adapted, in the closed position of the cap, to engage one edge of said shutter operating lever 29 and block operation of the same. Thus the shutter cannot be operated until the cap 27 is swung to opening position.

As will now be seen, in the starting position of the parts with the shutter assembly 25 in its starting setting, said assembly is locked after a picture is taken in this setting to prevent again exposing film. Under rotation of the turntable 18 to adjust the shutter assembly 25 into the diametrically opposite, or secondary, setting, the shutter assembly 25 is unlocked intermediate said settings for taking of a picture in said secondary setting and then again locked to prevent again exposing the film in this setting of the assembly. Also, as we have already seen, in the diametrically opposite, or secondary, setting of the shutter assembly 25, the turntable 18 is locked against further rotation until a new length of film 11 is fed into position so that said turntable 18 cannot be rotated to adjust the shutter assembly 25 to starting position until said new length is in proper position. Thus the taking of another picture in the starting position over one previously taken is prevented.

As will be understood, the catches 32 yieldingly latch the turntable 18 in either setting of the shutter assembly 25.

The foregoing will, it is believed, suffice to impart a clear understanding of my invention without further explanation.

Manifestly the invention, as described, is susceptible of modification without departing from the inventive concept and right is herein reserved to such modifications as fall within the scope of the subjoined claims.

What I claim is:

1. In a camera, a casing having a front wall, means in said casing for feeding a film to replace an exposed film section, a turntable embodied in said front wall for rotation thereon, a shutter assembly on said turntable adjustable under rotation of said table into diametrically opposite primary and secondary settings to take pictures on said film upon opposite sides of the longitudinal center of the film, means to automatically lock said shutter assembly against operation in either setting thereof after a picture has been taken, and means to lock said turntable against rotation in the secondary setting of said assembly until the exposed film section has been replaced.

2. In a camera, a casing having a front wall, means in said casing for feeding a film to replace an exposed section, a turntable embodied in said wall and rotatable thereon, a shutter assembly on said turntable adjustable under rotation of said table into diametrically opposite primary and secondary settings to take pictures on opposite sides of the longitudinal center of the film, means to lock the shutter assembly against operation after a picture has been taken in either setting of said assembly comprising a spring locking member on said assembly flexible into and from locking positions, respectively, and means to flex said member into unlocking position operative under rotation of said turntable to adjust said shutter assembly past either of said settings thereof.

3. In a camera, a casing having a front wall, means in said casing for feeding a film to replace an exposed section, a turntable embodied in said wall and rotatable thereon, a shutter assembly on said turn turntable adjustable under rotation of said table into diametrically opposite primary and secondary settings to take pictures on opposite sides of the longitudinal center of the film, means to lock the shutter assembly against operation after a picture has been taken in either setting of said assembly comprising a spring locking member on said assembly flexible into and from locking positions, respectively, and means to flex said member into unlocking position operative under rotation of said turntable to adjust said shutter assembly past either of said settings thereof, said means comprising a pair of cams on said front wall upon diametrically opposite sides of said turntable, and a finger on said member adapted to wipe over said cams.

4. In a camera, a casing having a front wall, means on said casing for feeding a film to replace an exposed section thereof, including a rewind reel and a rotary key for operating said reel, a turntable embodied in said front wall for rotation thereon, a shutter assembly on said turntable adjustable under rotation thereof into diametrically opposite primary and secondary settings to take pictures on said film on opposite sides of the longitudinal center thereof, and means to automatically lock said turntable against rotation in the secondary setting of said shutter assembly until an exposed section of said film has been replaced comprising a locking lever in said casing movable into and from locking position, spring means urging said lever into locking position, a stop on said turntable for engagement with said lever in the locking position of the latter, and means to move said lever into unlocking position operative under rotation of said key.

5. In a camera, a casing having a front wall, means on said casing for feeding a film to replace an exposed section thereof, including a rewind reel and a rotary key for operating said reel, a turntable embodied in said front wall for rotation thereon, a shutter assembly on said turntable adjustable under rotation thereof into diametrically opposite primary and secondary settings to take pictures on said film on opposite sides of the longitudinal center thereof, and means to automatically lock said turntable against rotation in the secondary setting of said shutter assembly until an exposed section of said film has been replaced comprising a locking lever in said casing movable into and from locking position, spring means urging said lever into locking position, a stop on said turntable for engagement with said lever in the locking position of the latter, and means to move said lever into unlocking position operative under rotation of said key, the last mentioned means comprising a disk rotatably mounted on said front wall in said casing, and trip lugs on said disk for engagement with said lever.

CHARLES F. O'BRIEN.